US011880638B2

United States Patent
Narioka et al.

(10) Patent No.: US 11,880,638 B2
(45) Date of Patent: Jan. 23, 2024

(54) METHOD FOR FORMING A FILM OR A CURABLE COMPOSITION, APPARATUS, AND STORAGE MEDIUM

(71) Applicant: CANON KABUSHIKI KAISHA, Tokyo (JP)

(72) Inventors: Shintaro Narioka, Tochigi (JP); Yuichiro Oguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 411 days.

(21) Appl. No.: 17/106,938

(22) Filed: Nov. 30, 2020

(65) Prior Publication Data

US 2021/0173986 A1 Jun. 10, 2021

(30) Foreign Application Priority Data

Dec. 4, 2019 (JP) ................................. 2019-219856

(51) Int. Cl.
*G06F 30/28* (2020.01)
*G03F 7/00* (2006.01)
(Continued)

(52) U.S. Cl.
CPC ............ *G06F 30/28* (2020.01); *G03F 7/0002* (2013.01); *G06F 2111/10* (2020.01); *G06F 2113/08* (2020.01)

(58) Field of Classification Search
CPC .. G06F 30/28; G06F 2111/10; G06F 2113/08; G06F 30/20; G03F 7/0002; G03F 7/70491
See application file for complete search history.

(56) References Cited

U.S. PATENT DOCUMENTS

| 9,201,990 | B2 | 12/2015 | Wakamatsu |
| 10,569,449 | B1 * | 2/2020 | Curts ................ B29C 43/003 |
| 2014/0131313 | A1 * | 5/2014 | Wakamatsu ........... G06F 30/20 |
| | | | 703/2 |

FOREIGN PATENT DOCUMENTS

| JP | 5599356 B2 | 10/2014 |
| JP | 2016027963 A | 2/2016 |

(Continued)

OTHER PUBLICATIONS

Andrew Cochrane et al., "Multiphase model for nanoimprint lithography," International Journal of Multiphase Flow 104 (2018) 9-19 (Year: 2019).*

(Continued)

*Primary Examiner* — Steven W Crabb
(74) *Attorney, Agent, or Firm* — ROSSI, KIMMS & McDOWELL LLP

(57) ABSTRACT

A simulation method predicts a behavior of a curable composition in a process of bringing droplets of the curable composition arranged on first and second members into contact with each other, and forming a film of the curable composition on the first member. The method includes inputting a physical property value of a gas between the first and second members, inputting a movement profile of the second member with respect to the first member when bringing the droplets of the curable composition on the first and second members into contact with each other, obtaining a pressure of the gas between the first and second members based on the physical property value and the input movement profile, and predicting, based on the pressure, an amount of a residual gas confined among the droplets by the contact between the droplets and the second member.

18 Claims, 10 Drawing Sheets

(51) Int. Cl.
*G06F 111/10* (2020.01)
*G06F 113/08* (2020.01)

(56) References Cited

FOREIGN PATENT DOCUMENTS

| | | |
|---|---|---|
| JP | 2018060878 A | 4/2018 |
| JP | 2019079926 A | 5/2019 |
| JP | 2019145591 A | 8/2019 |
| WO | 2015068215 A1 | 5/2015 |

OTHER PUBLICATIONS

Taylor, "Defectivity prediction for droplet-dispensed UV nanoimprint lithography, enabled by fast simulation of resin flow at feature, droplet, and template scales" Alternative Lithographic Technologies VII, Proceedings of SPIE., 2016: pp. 97770E-1-97770E-11. vol. 9777.

* cited by examiner

FIG. 6A
| Time | h' |
|---|---|
| 0 | 0. |
| 0.1 | 0.1 |
| 0.2 | 0.2 |
| 0.3 | 0.2 |
| 0.4 | 0.1 |
| 0.5 | 0 |
| . | . |
| . | . |
| . | . |
| . | . |
FIG. 6B
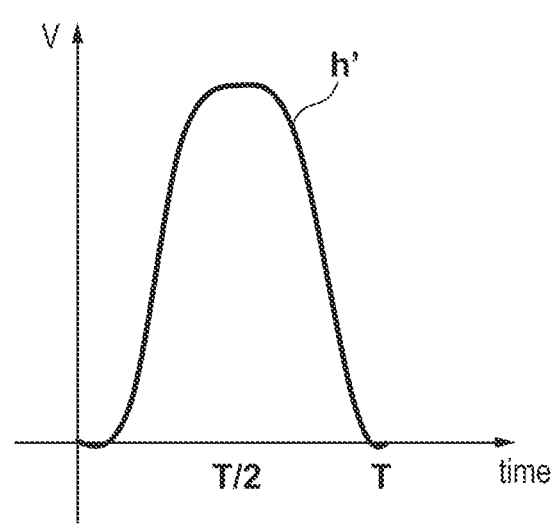
FIG. 6C
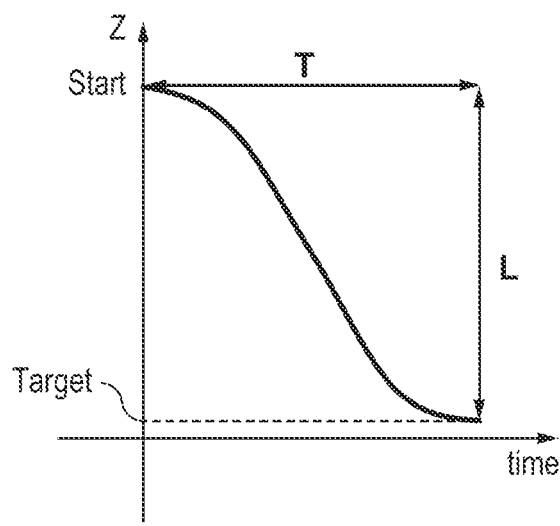
FIG. 6D
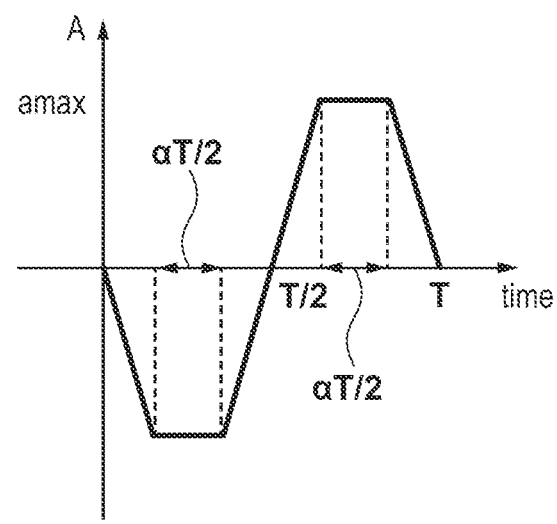

FIG. 9A
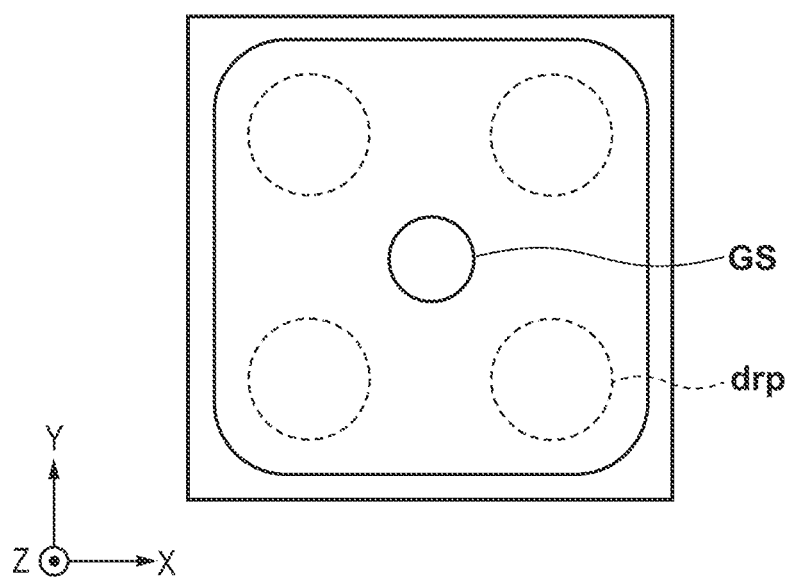
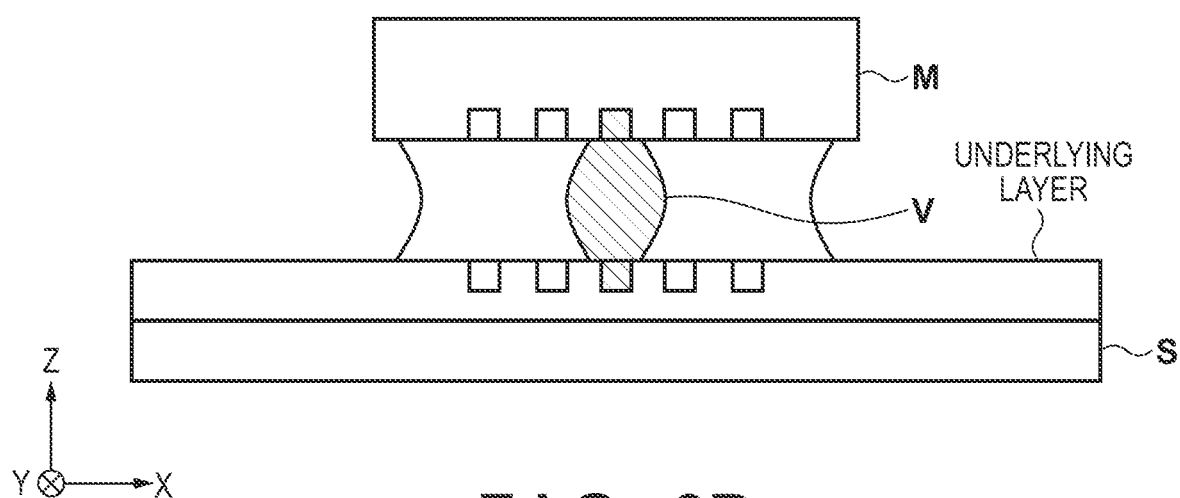
FIG. 9B

METHOD FOR FORMING A FILM OR A CURABLE COMPOSITION, APPARATUS, AND STORAGE MEDIUM

BACKGROUND OF THE INVENTION

Field of the Invention

The present invention relates to a simulation method, a simulation apparatus, and a storage medium.

Description of the Related Art

There is provided a film forming method of forming a film made of a cured product of a curable composition on a substrate by arranging the curable composition on the substrate, bringing the curable composition and a mold into contact with each other, and curing the curable composition. Such film forming method can be applied to an imprint method and a planarization method. In the imprint method, by using a mold having a pattern, the pattern of the mold is transferred to a curable composition on a substrate. In the planarization method, by using a mold having a flat surface, a film having a flat upper surface is formed by bringing a curable composition on a substrate and the flat surface into contact with each other and curing the curable composition.

The curable composition can be arranged in the form of droplets on the substrate. After that, the mold can be pressed against the droplets of the curable composition on the substrate. This spreads the droplets to form a film of the curable composition. In this process, it is important to form a film of the curable composition with a uniform thickness and to include no bubble in the film. To achieve this, the arrangement of the droplets, a method and a condition for pressing the mold against the droplets, and the like can be adjusted. To implement this adjustment operation by trial and error including film formation using a film forming apparatus, enormous time and cost are required. To cope with this, it is desired that a simulator for supporting such adjustment operation appears.

If there is a bubble (residual gas) in a film and the bubble does not completely disappear before release, unfilled defects may occur. Therefore, to correctly predict unfilled defects caused by a residual gas in a film, a method of simulating the influence of the residual gas confined among a plurality of droplets by wet spreading and merging of the plurality of droplets is particularly desired.

In general, when performing a simulation, if computation is performed by faithfully reproducing phenomena, a computation amount is too large to obtain a necessary solution within a practical computation time. To cope with this, it is common practice to perform computation without reproducing a phenomenon which has been determined not to contribute to a result to be obtained by the manufacturer or user of a simulator. In fact, however, if a phenomenon contributing to the result is also eliminated, an erroneous result may be obtained.

Hayden K. Taylor, "Defectivity prediction for droplet-dispensed UV nanoimprint lithography, enabled by fast simulation of resin flow at feature, droplet, and template scales". Proceedings of SPIE Vol, 9777, 97770E (2016) discloses a simulation method of predicting wet spreading and merging of a plurality of droplets contacting a mold that lowers at a constant velocity. This literature describes that a space confined among the plurality of droplets is formed but a gas in this space is neglected. That is, only the volume of the confined space is concerned, and computation is performed by eliminating the influence of the gas in this volume.

Japanese Patent No. 5599356 discloses a simulation method of predicting wet spreading and merging of a plurality of droplets using gas-liquid two-phase flow analysis. This literature considers a gas but does not describe the motion of a mold. It is considered that at the start of computation, the mold already contacts droplets, and computation is performed with respect to the droplets that have started wet-spreading between the mold and a substrate and a gas around the droplets. That is, an influence on the gas by the motion of the mold before and after liquid contact is neglected.

However, in the conventional simulation methods, it is impossible to correctly simulate the influence of a residual gas confined among a plurality of droplets by wet-spreading and merging of the plurality droplets, and it may thus be impossible to correctly predict unfilled defects caused by the residual gas in a film.

SUMMARY OF THE INVENTION

The present invention provides a technique advantageous in improving the prediction accuracy of unfilled defects caused by a residual gas in a film.

The present invention in its one aspect provides a simulation method of predicting a behavior of a curable composition in a process of bringing a plurality of droplets of the curable composition arranged on a first member and a second member into contact with each other, and forming a film of the curable composition on the first member, comprising inputting a physical property value of a gas between the first member and the second member, inputting a movement profile of the second member with respect to the first member when bringing the plurality of droplets of the curable composition arranged on the first member and the second member into contact with each other, obtaining a pressure of the gas between the first member and the second member based on the input physical property value and the input movement profile, and predicting, based on the obtained pressure, an amount of a residual gas confined among the plurality of droplets by the contact between the plurality of droplets and the second member.

Further features of the present invention will become apparent from the following description of exemplary embodiments (with reference to the attached drawings).

BRIEF DESCRIPTION OF THE DRAWINGS

FIGS. 6A to 6D are views exemplifying the velocity information of a mold;

FIGS. 9A and 9B are views for explaining a modification of a method of estimating the volume of a residual gas among droplets;

DESCRIPTION OF THE EMBODIMENTS

Figure 1:
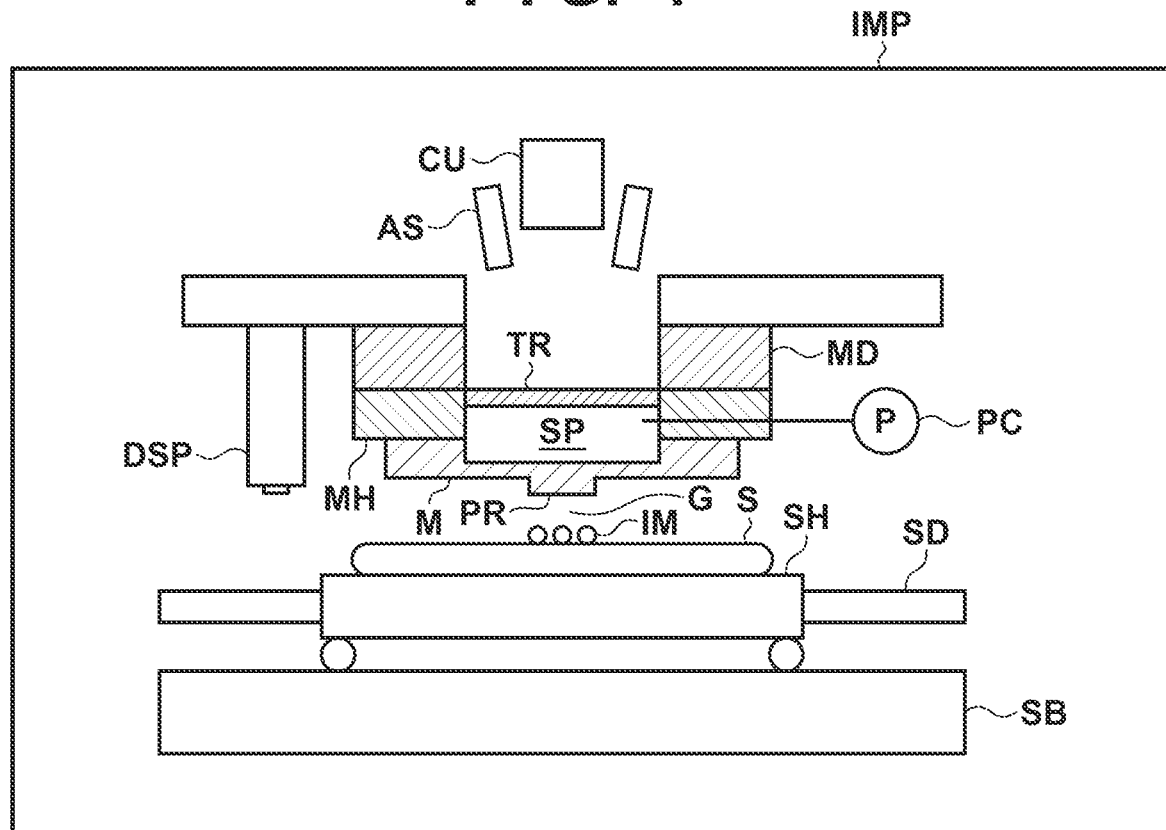
FIG. 1 is a view showing the arrangements of a film forming apparatus and a simulation apparatus.
Figure 1:
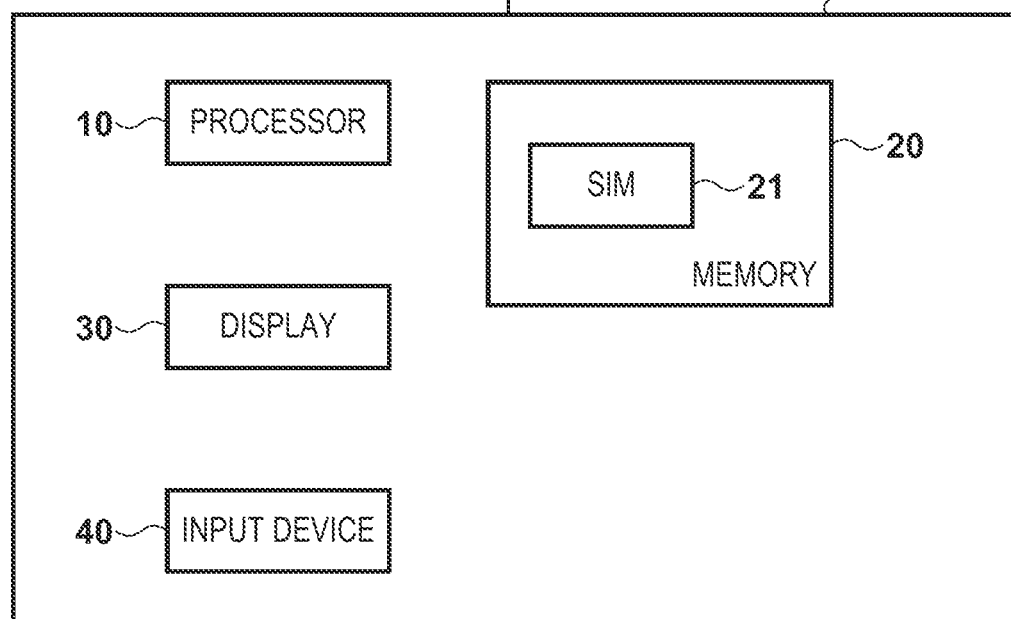

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 shows the arrangements of a film forming apparatus IMP and a simulation apparatus 1 according to an embodiment. The film forming apparatus IMP executes a process of bringing a plurality of droplets of a curable composition IM arranged on a substrate S and a mold M into contact with each other and forming a film of the curable composition IM in a space between the substrate S and the mold M. Note that in this specification, bringing the plurality of droplets of the curable composition IM arranged on the substrate S and the mold M into contact with each other will also be referred to as "liquid contact" hereinafter. The film forming apparatus IMP may be formed as, for example an imprint apparatus or a planarization apparatus. The substrate S and the mold M are interchangeable, and a film of the curable composition IM may be formed in the space between the mold M and the substrate S by bringing a plurality of droplets of the curable composition IM arranged on the mold M and the substrate S into contact with each other. Therefore, the film forming apparatus IMP is comprehensively an apparatus that executes a process of bringing a plurality of droplets of the curable composition IM arranged on the first member and the second member into contact with each other and forming a film of the curable composition IM in a space between the first member and the second member. An example in which the first member serves as the substrate S and the second member serves as the mold M will be described below. However, the first member may serve as the mold M and the second member may serve as the substrate S. In this case, the substrate S and the mold M in the following description are interchanged.

The imprint apparatus can use the mold M having a pattern to transfer the pattern of the mold M to the curable composition IM on the substrate S. The imprint apparatus can use the mold M having a pattern region PR provided with a pattern. The imprint apparatus can bring the curable composition IM on the substrate S and the pattern region PR of the mold M into contact with each other, fill, with the curable composition, a space between the mold M and a region where the pattern of the substrate S is to be formed, and then cure the curable composition IM. This transfers the pattern of the pattern region PR of the mold M to the curable composition IM on the substrate S. For example, the imprint apparatus can form a pattern made of a cured product of the curable composition IM on each of a plurality of shot regions of the substrate S.

Using the mold M having a flat surface, the planarization apparatus can bring the curable composition IM on the substrate S and the flat surface into contact with each other, and cure the curable composition IM thereby forming a film having a flat upper surface. The planarization apparatus can form a film made of a cured product of the curable composition IM on the entire region of the substrate S by normally using the mold M having a size that can cover the entire region of the substrate S.

As the curable composition, a material to be cured by receiving curing energy can be used. As the curing energy, an electromagnetic wave, heat, or the like can be used. The electromagnetic wave can include, for example, light selected from the wavelength range of 10 nm (inclusive) to 1 mm (inclusive) and, more specifically, infrared light, a visible light beam, or ultraviolet light. The curable composition can be a composition cured by light irradiation or heating. A photo-curable composition cured by light irradiation contains at least a polymerizable compound and a photopolymerization initiator, and may further contain a nonpolymerizable compound or a solvent as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition is, for example, 1 mPa·s (inclusive) to 100 mPa·s (inclusive). As the material of the substrate, for example, glass, a ceramic, a metal, a semiconductor, a resin, or the like can be used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively, A rotation about the X-axis, a rotation about the Y-axis, and a rotation about the Z-axis are $\theta X$, $\theta Y$ and $\theta Z$, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the $\theta X$-axis, the $\theta Y$-axis, and the $\theta Z$-ax is means control or driving concerning a rotation about an axis parallel to the X-axis, a rotation about an axis parallel to the Y-axis, and a rotation about an axis parallel to the Z-axis, respectively. In addition, a position is information that can be specified based on coordinates on the X-, Y-, and Z-axes, and an orientation is information that can be specified by values on the $\theta X$-, $\theta Y$-, and $\theta Z$-axes. Positioning means controlling the position and/or orientation.

The film forming apparatus IMP can include a substrate holder SH that holds the substrate S, a substrate driving mechanism SD that drives the substrate S by driving the substrate holder SH, and a support base SB that supports the substrate driving mechanism SD. In addition, the film forming apparatus IMP can include a mold holder MH that holds the mold M and a mold driving mechanism MD that drives the mold M by driving the mold holder MH. The substrate driving mechanism SD and the mold driving mechanism MD can form a relative driving mechanism that drives at least one of the substrate S and the mold M so as to adjust the relative position between the substrate S and the mold M.

Adjustment of the relative position by the relative driving mechanism can include driving to bring the curable composition IM on the substrate S and the mold M into contact with each other and driving to separate the mold M from the cured curable composition IM. In addition, adjustment of the relative position by the relative driving mechanism can include positioning between the substrate S and the mold M. The substrate driving mechanism SD can be configured to drive the substrate S with respect to a plurality of axes for example, three axes including the X-axis, Y-axis, and θ-axis, and preferably six axes including the X-axis, Y-axis, Z-axis, θX-axis, θY-axis, and θZ-axis). The mold driving mechanism MD can be configured to drive the mold M with respect to a plurality of axes (for example, three axes including the Z-axis, θX-axis, and θY-axis, and preferably six axes including the X-axis, Y-axis, Z-axis, θX-axis, θY-axis, and θ-axis).

The film forming apparatus IMP can include a curing device CU for curing the curable composition IM with which the space between the substrate S and the mold M is filled. For example, the curing device CU can irradiate the curable composition IM with the curing energy via the mold M, thereby curing the curable composition IM. The film forming apparatus IMP can include a transmissive member TR for forming a cavity space SP on the rear side (the opposite side of a surface opposing the substrate S) of the mold M. The transmissive member TR is made of a material that transmits the curing energy from the curing device CU, thereby making it possible to irradiate the curable composition IM with the curing energy. The film forming apparatus IMP can include a pressure control unit PC that controls deformation of the mold M in the Z-axis direction by controlling the pressure of the cavity space SP. For example, when the pressure control unit PC makes the pressure of the cavity space SP higher than the atmospheric pressure, the mold M can be deformed in a convex shape toward the substrate S.

The film forming apparatus IMP can include a dispenser DSP for arranging, supplying, or distributing the curable composition IM on the substrate S. The substrate S on which the curable composition IM is arranged by another apparatus may be supplied to the film forming apparatus IMP. In this case, the film forming apparatus IMP need not include the dispenser DSR. The film forming apparatus IMP may include an alignment scope AS for measuring an alignment error between the substrate S (or the shot region of the substrate S) and the mold M.

The simulation apparatus 1 can execute computation of predicting the behavior of the curable composition IM in a process executed by the film forming apparatus IMP. More specifically, the simulation apparatus 1 can execute computation of predicting the behavior of the curable composition IM in the process of bringing the plurality of droplets of the curable composition IM arranged on the substrate S and the mold M into contact with each other and forming a film of the curable composition IM in the space between the substrate S and the mold M.

The simulation apparatus 1 can be formed by, for example, incorporating a simulation program 21 in a general-purpose or dedicated computer. Alternatively, the simulation apparatus 1 can be formed b a PLD (Programmable Logic Device) such as an FPGA, (Field Programmable Gate Array) or an ASIC (Application Specific Integrated Circuit). In one example, the simulation apparatus 1 can be formed by preparing a computer including a processor 10, a memory 20, a display 30, and an input device 40 and storing the simulation program 21 in the memory 20. The memory 20 may be a semiconductor memory, a disk such as a hard disk, or a memory of another form. The simulation program 21 can be stored in a computer-readable memory medium or provided to the simulation apparatus 1 via a communication facility such as a telecommunication network.

When the plurality of droplets of the curable composition arranged on the substrate S and the mold M are brought into contact with each other, that is, at the time of liquid contact (for example, at the time of an imprint operation), the mold driving mechanism MD causes the motion of the mold M toward the substrate S. At this time, a gas between the mold M and the substrate S is pressed by the motion of the mold M, thereby increasing the pressure. Therefore, the pressure of a residual gas confined among the plurality of droplets can be influenced by the motion of the mold M at the time of liquid contact.

The amount of the residual gas, that is, the number n of molecules of the residual gas is given b $n=pV/RT$ by the state equation of an ideal gas, and is thus influenced by the pressure of the residual gas. Since, however, the conventional, simulation methods neglect the influence of an increase in pressure of the gas caused by the motion of the mold, the number of molecules of the residual gas is underestimated, and thus the number of unfilled defects may be underpredicted. To cope with this, in this embodiment, to accurately predict unfilled defects caused by the residual gas, a change in pressure of the gas caused by the motion of the mold M at the time of liquid contact is considered.

Figure 11:
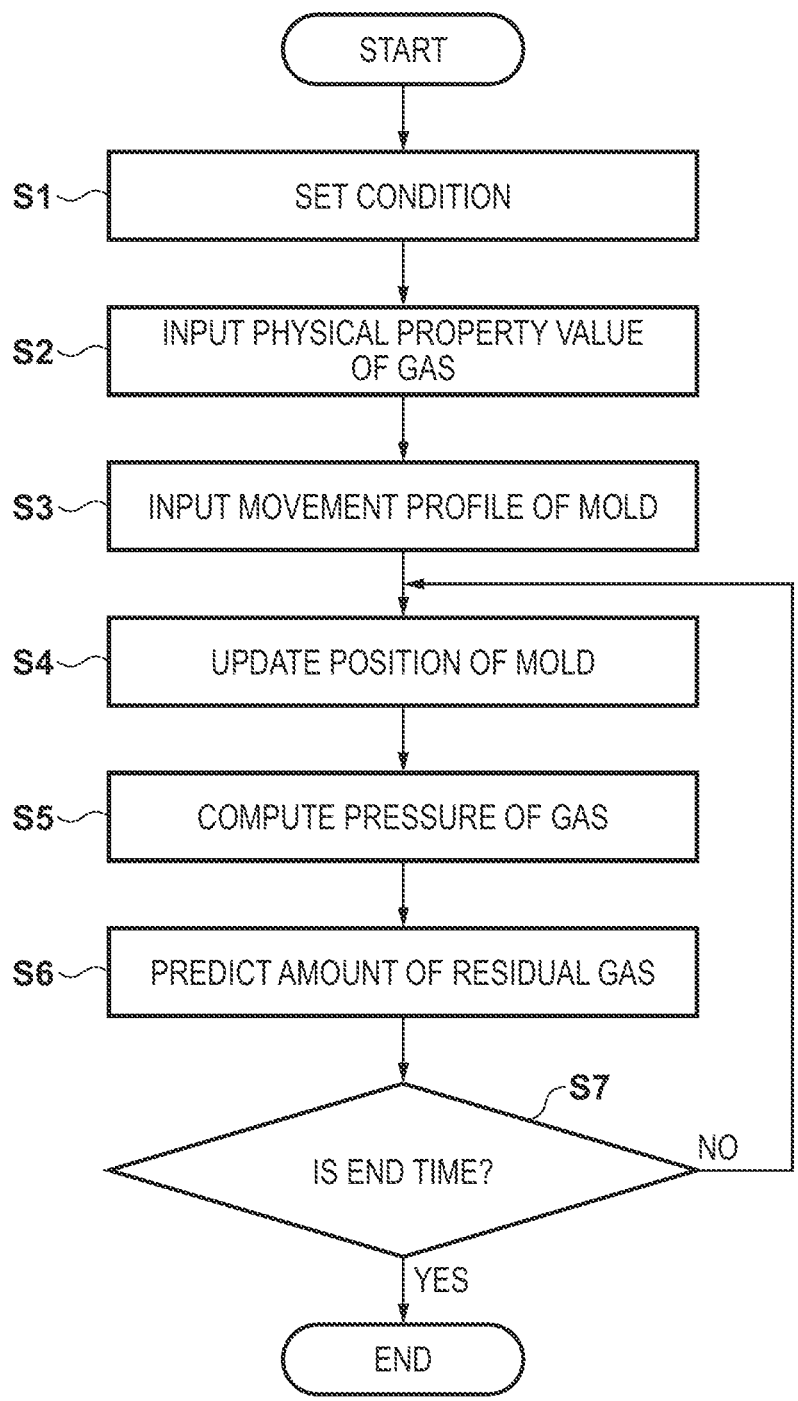
FIG. 11 is a flowchart illustrating a simulation method.

A simulation method executed by the simulation apparatus 1 will be described below with reference to a flowchart shown in FIG. 11. The simulation apparatus 1 can be understood as an aggregate of hardware components that execute respective steps of this flowchart, respectively. Typically, a program corresponding to the flowchart is included in, for example, the simulation program 21, and can be executed by the processor 10.

Step S1 is a step of setting a condition (parameters) necessary for simulation. The parameters can include the arrangement of the droplets of the curable composition IM on the substrate S, the volume of each droplet, the physical property value of the curable composition IM, information concerning unevenness (for example, information of the pattern of the pattern region PR) of the surface of the mold M, and information concerning unevenness of the surface of the substrate S. The parameters can include a profile of a pressure applied to the space SP (mold M) by the pressure control unit PC.

Step S2 is a step of inputting the physical property value of a gas G between the substrate S and the mold M. The physical property value of the gas G can include a value representing the density of the gas G and a value (for example, a viscosity coefficient) representing the viscosity.

Step S3 is a step of inputting the movement profile of the mold M. A time profile of a force applied to the mold M by the mold driving mechanism MD may be input.

Note that steps S1 to S3 may be understood as one step, for example, as a preparation step.

Step S4 is a step of computing the motion of the mold M and updating the position of the mold M.

Step S5 is a step of computing the pressure of the gas G between the mold M and the substrate S.

Step S6 is a step of predicting the amount of the residual gas confined among the plurality of droplets by an imprint operation.

In step S7 it is determined whether the time in the process of updating the position of the mold M in step S4, computing the pressure of the gas G in step S5, and predicting the amount of the residual gas in step S6 has reached an end time. If the time has not reached the end time, the time advances to a next time, and the process returns to step S4 to repeat the process; otherwise, the simulation method ends.

Figure 2:
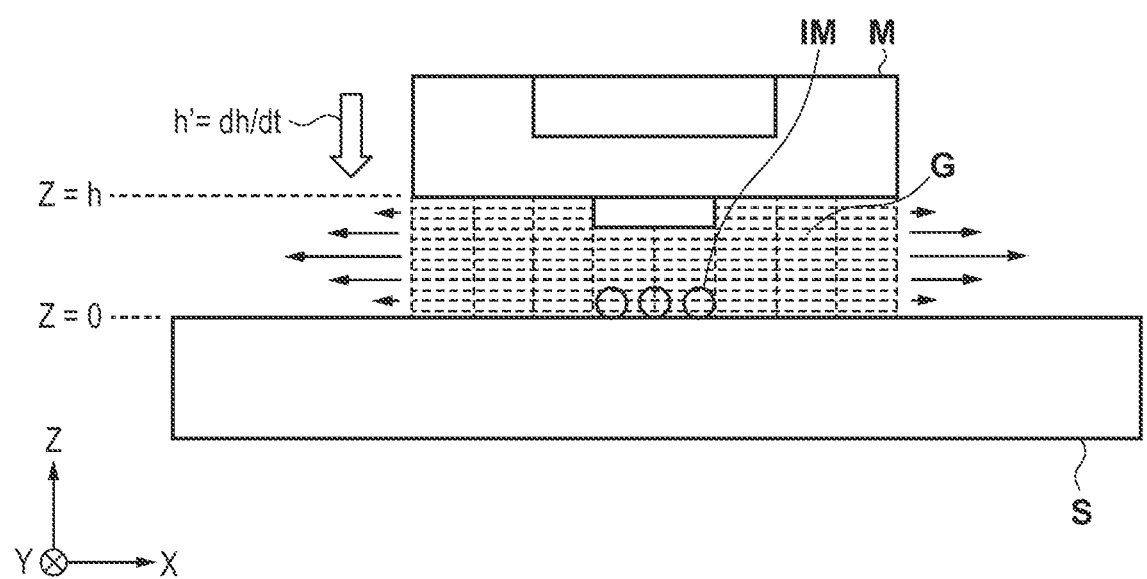
FIG. 2 is a view schematically showing the behavior of a mold at the time of an imprint operation.

FIG. 2 is a view schematically showing the behavior of the mold M at the time of an imprint operation. Assume that the mold driving mechanism MD causes the mold M to move downward toward the substrate S at a velocity h'=dh/dt. At this time, since the gas G between the mold M and the substrate S is pressed by the mold M while being extruded from the space between the mold M and the substrate S, a pressure p of the gas G increases. The pressure p of the gas G between the substrate S and the mold M is computed, as follows. For example, when f represents an external three acting on the gas G, a fluid velocity u and the pressure p at each position in an analytic space set between the mold M and the substrate S are computed by Navier-Stokes equation (1) and an equation (2) of continuity.

$$\frac{\partial u}{\partial t} + (u \cdot \nabla)u = -\frac{1}{\rho}\nabla p + \frac{\mu}{\rho}\nabla^2 u + f \qquad (1)$$

$$\nabla \cdot u = 0 \qquad (2)$$

In equation (1), ρ represents the density of the gas G and μ represents the viscosity coefficient of the gas G.

FIG. 2 exemplifies, by broken lines, between the mold M and the substrate S, the computational grid of the analytic space that can be defined when computing the pressure p of the gas G between the mold M and the substrate S by the motion of the mold M using a general method. The distance between the mold M and the substrate S is 100 μm to 1 mm at the start of an imprint operation, and is, for example, 1 μm to 100 μm depending on a place immediately before liquid contact. In this case, in the normal simulation method, a computational grid sufficiently smaller than the distance between the mold M and the substrate S immediately before liquid contact is defined in the analytic space. However, if a computational grid formed by small computational components is defined, the computation amount is enormous, and it can hardly be expected to obtain a computation result within an allowable time.

Therefore, the fact that while the size in the X and Y directions of the mold M is 100 mm to 300 mm, the distance in the Z direction between the mold M and the substrate S is sufficiently short is used. Since the influence of the wall surface is large near the mold M or the substrate S, it can be assumed that if the distance in the Z direction is short, the influence of the viscosity is large and the fluid inertial force is negligible, as compared with the fluid viscous force. Under this assumption, it is possible to ignore the left-hand side of equation (1) with respect to the first and second terms of the right-hand side, and thus set 0 on the left-hand side. In addition, by assuming that (a) the external force f is negligible, equation (1) is simplified into equation (3) below.

$$0 = -\frac{1}{\rho}\nabla p + \frac{\mu}{\rho}\nabla^2 u \qquad (3)$$

With respect to equation (3), it can be assumed that (b) there is no sliding among the mold M, the substrate S, and the gas G and (c) the pressure p of the gas G is constant in the Z direction. Under this assumption, integration is performed in the Z direction from z=0 to the height z=h between the mold M and the substrate S, thereby obtaining equations (4) and (5) below. Note that $u_x$ and $u_y$ represent the X- and Y-direction components of the velocity u, respectively.

$$u_x = \frac{1}{2\mu}\frac{dp}{dx}z(z-h) \qquad (4)$$

$$u_y = \frac{1}{2\mu}\frac{dp}{dy}z(z-h) \qquad (5)$$

By substituting equations (4) and (5) into equation (2), and performing integration in the direction equation (6) below is obtained.

$$\nabla \cdot \left(-\frac{h^3}{12\mu}\nabla p\right) + h' = 0 \qquad (6)$$

The velocity h'=dh/dt (moving velocity) of the mold M is obtained from, for example, the input movement profile. Equation (6) is a relational expression representing the relationship between the velocity h'=dh/dt of the mold M and the pressure p of the gas G between the mold M and the substrate S. Equation (6) is known as a lubrication equation in the bearing engineering field.

As indicated by equations (4) and (5), the use of equation (6) corresponds to approximation of the velocity distribution in the Z direction between the mold M and the substrate S to a parabola. Furthermore, since the pressure distribution between the mold M and the substrate S is assumed to be constant, the pressure distribution and the velocity distribution in the Z direction between the mold M and the substrate S are decided, and it is thus unnecessary to divide the computational grid in the Z direction. If equation (4) is solved using a difference method or the like on the computational grid divided only in the X and Y directions, the possibility that the pressure p of the gas G between the mold M and the substrate S can be solved within a practical computation time becomes high. It is possible to estimate the influence of the motion of the mold M on the pressure p of the G.

Figure 3:
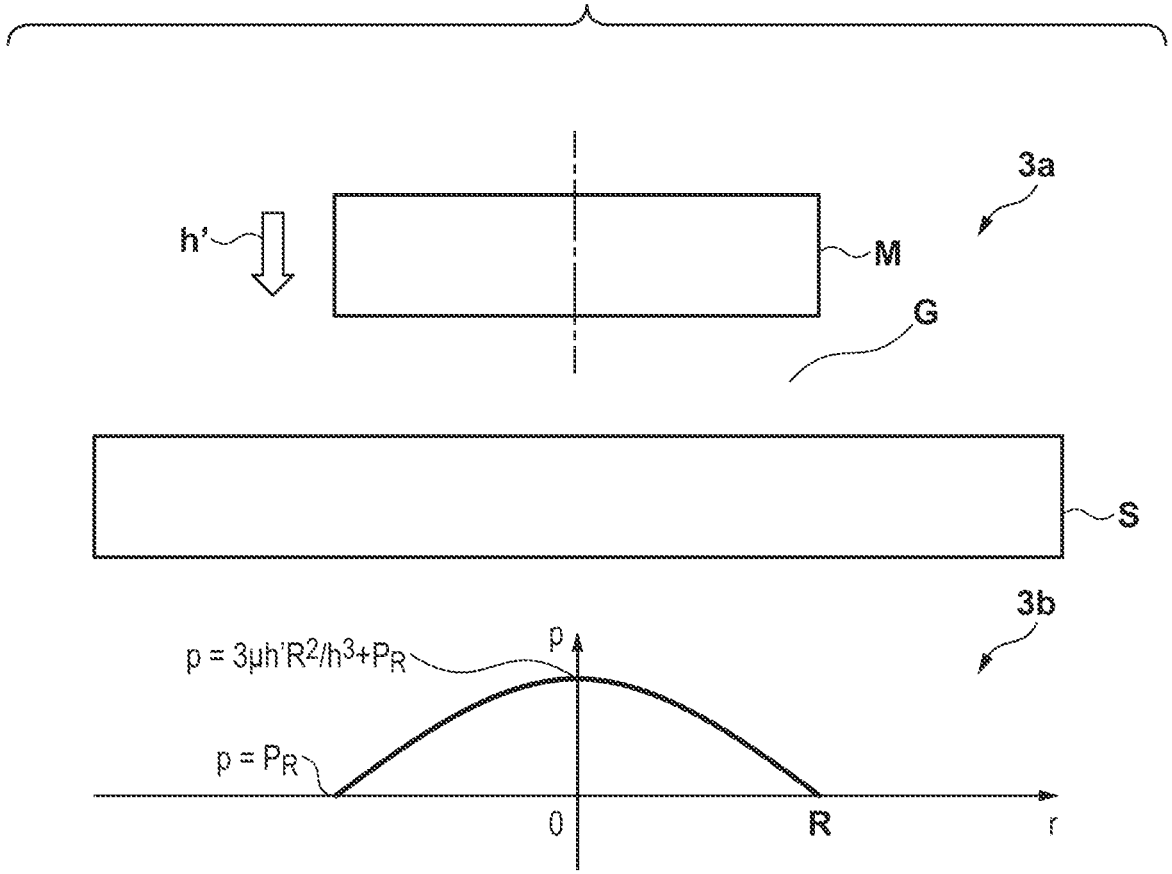
FIG. 3 is a view showing the distribution of the pressure of a gas between a mold and a substrate.

The relationship between the velocity h' of the mold M and the pressure p of the gas G will be described next with reference to FIG. 3. In general, equation (6) is solved on the computational grid divided in the X and Y directions. However, if the shape of the mold M is simple, it is possible to analytically solve equation (6), and to know how the pressure p of the gas G generally changes when changing the velocity h' of the mold M. Assume that the mold M is a columnar rigid body having a radius R. When equation (6) is solved by setting the velocity h' of the mold M to be constant and setting, as a boundary condition, a pressure $p_R$ at a position of the radius R, equation (7) below is obtained as the distribution of the pressure p of the gas G between the mold M and the substrate S.

$$p(r) = \frac{3\mu h'}{h^3}(R^2 - r^2) + p_R \qquad (7)$$

The pressure $p_R$ at the position of the radius R is set to a pressure just outside the mold M ii the film forming apparatus, and is normally set to the atmospheric pressure. FIG. 3 shows a schematic view 3a and a graph 3b of equation (7).

It becomes apparent from the graph 3b that the pressure p of the gas G between the mold M and the substrate. S has the distribution under the mold M. According to equation (7), it is understood that the pressure p of the gas G between the mold M and the substrate S is proportional to the velocity h' of the mold M, and is inversely proportional to the cube of a distance it in the Z direction between the mold M and the substrate S. That is, it is understood that if the distance h in the Z direction between the mold M and the substrate S becomes short, the velocity h' of the mold M exerts an influence to abruptly increase the pressure p of the gas G.

At the time of liquid contact tan imprint operation), the pressure of the residual gas confined among the plurality of droplets becomes equal to the pressure p of the gas G between the mold M and the substrate S, and can thus be influenced by the motion of the mold at the time of liquid contact. As described above, the pressure of the residual gas influences the number n of molecules of the residual gas. Therefore, the influence of the pressure p of the gas G by the motion of the mold is not negligible. Therefore, in this embodiment, it is possible to input the velocity h' of the mold at the time of liquid contact to the simulation apparatus 1. For example, the movement profile input in step S3 may include the value of the velocity h' at each time. This considers the pressure p of the gas G between the mold M and the substrate S by the motion of the mold M.

Figure 4A:
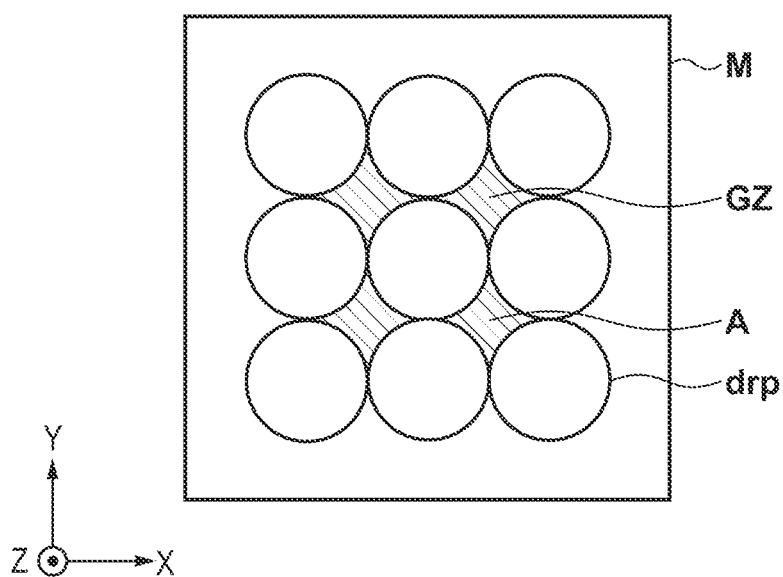
FIGS. 4A and 4B are views schematically showing a residual gas among droplets.
Figure 4B:
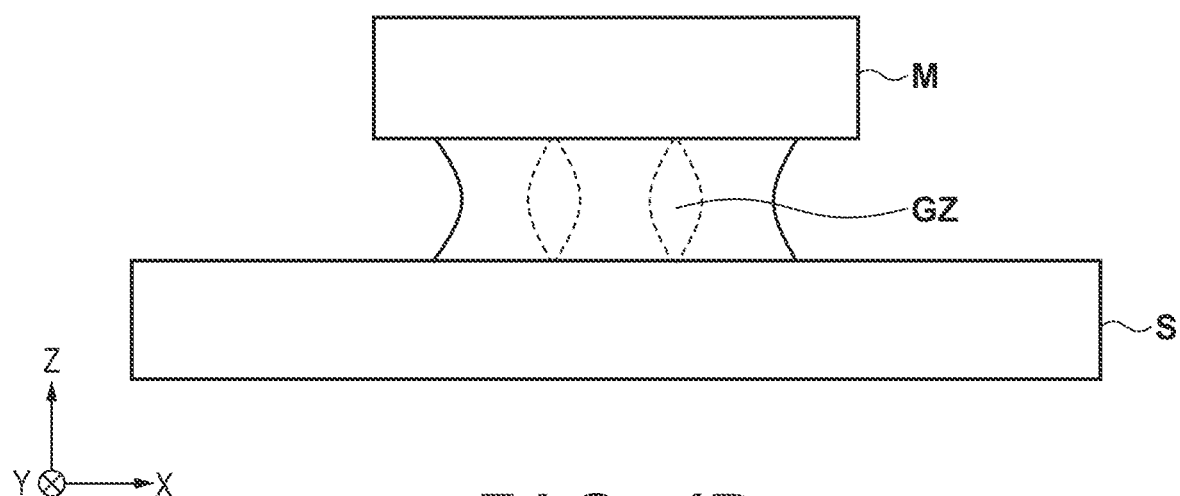

A method of estimating the number n of molecules of a residual gas GZ confined by the plurality of droplets after liquid contact will be described with reference to FIGS. 4A and 4B. FIGS. 4A and 4B are views schematically showing the residual gas GZ confined by the plurality of droplets under the mold M. FIG. 4A is a plan view when viewed from above in the Z direction, and FIG. 4B is a side view. As described above, the number n of molecules of the given residual gas GZ is given by n=pV/RT by the state equation of an ideal gas where p represents the pressure of the gas G, V represents a volume, R represents a gas constant, and T represents a temperature. According to this state equation, to predict the number n of molecules of the residual gas, it is necessary to know the pressure p and the temperature T in addition to the volume V of the gas confined among the plurality of droplets. Therefore, in this embodiment, the temperature T of the gas G can be input to the simulation apparatus 1. The temperature T may be set to the temperature in the film forming apparatus. The volume V of the gas confined by the plurality of droplets is set to a volume surrounded by the plurality of droplets, the mold M, and the substrate S. Since the pressure p of the gas G has been obtained, the number n of molecules of the residual gas GZ can be estimated.

The residual gas GZ dissolves and diffuses in surrounding media including the mold M and the substrate S, thereby gradually decreasing the number n of molecules. If the molecules forming the residual gas GZ disappear before the time of release, it is considered that the droplets spread in a place where the residual gas GZ originally existed, causing no unfilled defects. On the other hand, if the molecules of the residual gas GZ do not disappear before the time of release, the droplets cannot sufficiently spread in the place where the residual gas GZ originally existed, causing unfilled defects.

Therefore to predict the number of unfilled defects, it is necessary to predict the time until the residual gas disappears. To predict this, diffusion of the residual gas in the surrounding media is computed. Computation of the diffusion of the residual gas in the surrounding media can be applied with equation (8) as a general diffusion equation.

$$\frac{\partial C}{\partial t} + \nabla \cdot (-D\nabla C) = 0 \tag{8}$$

where D represents a diffusion coefficient of the gas G in the media, and C represents a molar concentration of the gas G in the media.

By solving equation (8) by a difference method or the like on the computational grid divided in the X, Y, and Z directions, a behavior in which the molecules forming, the residual gas diffuse in the surrounding media can be analyzed, thereby estimating the time until the residual gas disappears.

A method of estimating, the time until the residual gas disappears will further be described with reference to FIG. 5. In general, equation (8) is solved using the difference method or the like on the computational grid divided in the X, Y, and Z directions. However, if a simple status is assumed, equation (8) can be analytically solved, and a method of knowing a velocity at which the gas molecules disappear is readily explained. As a simple status, the following status is assumed.

(a) The residual gas GZ dissolves and diffuses in only the mold M among the surrounding media.

(b) The molecules of the residual gas GZ diffuse one-dimensionally in Z direction in the mold M.

(c) The time required by the molecules of the residual gas GZ to reach the opposite side of the mold M is sufficiently long, and the mold M is regarded as to semi-infinite body that continues while Z=0 to ∞).

Figure 5:
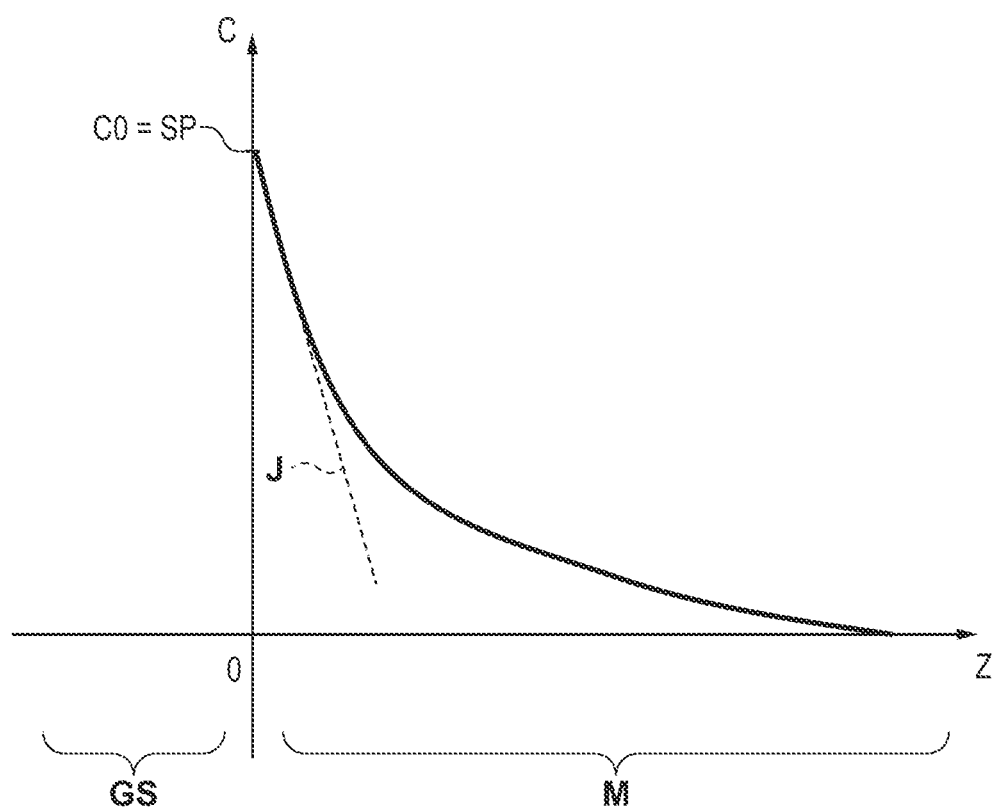
FIG. 5 is a graph schematically showing the diffusion flux of the residual gas to die mold.

FIG. 5 schematically shows this status. Z>0 indicates the inside of the mold M, and Z=0 indicates the interface between the mold M and the residual gas GZ. The ordinate indicates the gas molecular concentration C in the mold M, and the gas molecular concentration at the interface Z=0 is represented by C0. At this time, the solution of equation (8) is given by:

$$C = C_0 \mathrm{erfc}\left(\frac{z}{\sqrt{4Dt}}\right) \tag{9}$$

where erfc represents a complementary error function.

The distribution of the gas molecules in the mold M after a time t elapses since the start of diffusion of the gas G in the mold M is indicated by a solid line in FIG. 5. It is apparent that the gas molecular concentration is highest at the interface, and gradually decreases toward the inside of the mold M.

Assuming that the Henry's law holds at the interface between the residual gas and the mold M, the gas molecular concentration C0 at the interface Z=0 is given by C0=S'p where p represents the pressure of the residual gas GZ, and S represents the solubility of the residual gas GZ in the mold M.

A value obtained by multiplying an inclination dC/dz of the gas molecular concentration C at Z0 by the diffusion coefficient D corresponds to a velocity per unit time per unit area at which the residual gas GZ at time t diffuses in the mold M, that is, a diffusion flux J. This can be estimated, as follows.

$$J = -D\frac{dC}{dz}\bigg|_{z=0} = C_0\sqrt{\frac{D}{\pi t}} \tag{10}$$

If the diffusion flux J is multiplied by an area A, indicated by a hatched portion in FIG. 4A, where the residual gas GZ contacts the mold M, the number dn/dt of disappearing molecules of the residual gas GZ per unit time is obtained.

$$\frac{dn}{dt} = J \cdot A \tag{11}$$

If the number n of molecules obtained by integrating the above value at each time until release time does not reach the number of molecules of the residual gas GZ, it can be considered that unfilled defects occur. In fact, the distribution of the gas molecular concentration is solved on the computational grid divided in the X, Y, and Z directions, and the diffusion flux J is computed from the inclination dC/dz at the interface, and is integrated, thereby estimating the number n of molecules.

As described above, when the diffusion coefficient and solubility of the gas are further input, it is possible to estimate whether the residual gas GZ disappears before the time of release, and improve the prediction accuracy of the number of unfilled defects caused by the residual gas GZ.

Note that the residual gas dissolves and diffuses only in the mold M for the sake of descriptive convenience. However, dissolution and diffusion of the residual gas in the substrate S as another surrounding medium, the droplets, or an underlying film on the substrate S may be considered.

The dissolution and diffusion of the gas G may occur even before the gas G is confined among the droplets or before liquid contact of the mold M. In this case, the number n of molecules of the residual gas GZ is predicted to decrease by an amount corresponding to the dissolution and diffusion of the gas G. As described above, if the dissolution and diffusion of the gas G that can occur even before liquid contact are considered, it is possible to further improve the prediction accuracy of the number of unfilled defects caused by the residual gas GZ.

Second Embodiment

A modification of a method of estimating a pressure p of a gas C will be described below. A velocity h' of a mold M of equation (6) can change moment by moment during an imprint operation. Therefore, an input movement profile can include the value of the velocity of the mold M at each time. For example, a table, shown in FIG. 6A, representing the correspondence between the time and the velocity of the mold M may be input as a movement profile to a simulation. Alternatively, a function, shown in FIG. 6, representing the velocity of the mold M with respect to the time may be input as a movement profile to a simulation. Alternatively the relationship between the time and the position, the acceleration, or the time change rate of the acceleration of the mold M instead of the velocity of the mold M may be input as a movement profile to a simulation. For example, there can be provided an input method of giving the position of the mold M by designating a moving target position Target, a moving distance L, and a moving time T of the mold M, as shown in FIG. 6C. Alternatively, a value indicating the time ratio of a constant acceleration section in the acceleration profile of the mold M may be input as a movement profile. For example, as shown in FIG. 6D, there can be provided an input method of giving a tune ratio α of the constant acceleration section by assuming the time profile of the acceleration of the mold M as a trapezoidal waveform.

If information of the motion of the mold M is given by the method shown in FIG. 6C or 6D, it is easy to compute the velocity of the mold M at each time from the information. Equation (6) is solved at each time using the velocity h' of the mold M. In this way, it is possible to consider the pressure p of the gas G between the mold M and a substrate S by the velocity h' of the mold M that changes moment by moment.

Figure 7:
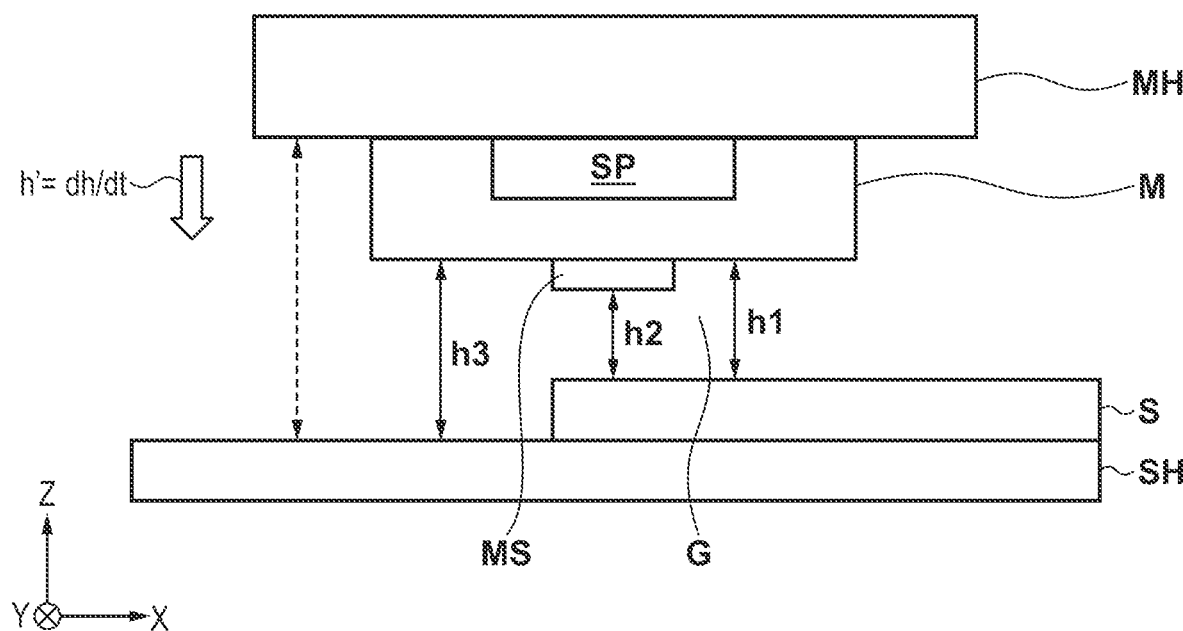
FIG. 7 is a view for explaining the distribution of the distance between the mold and a substrate.

FIG. 7 is a view schematically showing the positional relationship between the mold M and the substrate S when imprinting a shot region near the end of the substrate S. The substrate S is held by a substrate holder SH that holds the substrate S, and the mold M is held by a mold holder MH that holds the mold M. The mold M includes a mesa portion MS in which a pattern to be transferred to a curable composition arranged on the substrate S is formed. The mesa portion MS of the mold M contacting the substrate S at the time of an imprint operation includes, for example, a rectangular region having a length of 20 to 40 mm on each side, and the region protrudes from the periphery toward the substrate S by 10 to 50 µm. At this time, a distance h2 between the lower surface of the mesa portion MS and the substrate S is 10 to 50 µm shorter than a distance h1 between the substrate S and a surface of the mold M other than the mesa portion MS. On the other hand, in the periphery of the substrate S, there can be a structure like the substrate holder SH at a position 100 to 500 µm lower than the substrate S. At this time, a distance h3 between the substrate holder SH and the surface of the mold M other than the mesa portion MS is 100 to 500 µm longer than h1.

As an example of the solution of equation (6), by analogy of equation (7) above, the pressure p of the gas G between the mold M and a member opposing the mold M is inversely proportional to the cube of the distance h between them. Therefore, it is considered that the pressure p of the gas G between the mold M and the substrate S is particularly large in a region at the shortest distance h2 among the distances h1 to h3, and is small in a region at the longest distance h3. It is, therefore, desirable to consider the distribution of the pressure p of the gas G between the mold M and the surface opposing it, that reflects the distribution of the distance h between the mold M and the surface opposing it. To obtain the distribution of the pressure p of the gas G reflecting the distribution of h in the X-Y plane, computation is performed by giving h of a different value for each computational grid in the X and Y directions when solving equation (6). This makes it possible to consider the distribution of the pressure p of the gas reflecting the distribution of the distance h between the mold M and the surface opposing it in the plane.

In the embodiment, a simulation apparatus 1 can receive the position, size, and height of the mesa portion MS with respect to the reference position (for example, the center in the X and Y directions) of the mold M to reflect the distribution of the distance h between the mold M and the surface opposing it on a simulation. The simulation apparatus can receive the position, size, and height with respect to the substrate holder SH of the substrate S. In addition, the simulation apparatus 1 can receive the relative position in the X and Y directions between the mold M and the substrate S, that is, an imprint position (the position of the shot region) on the surface of the substrate S. This allows the simulation apparatus to predict unfilled defects in consideration of the influence of the distance h between the mold M and the substrate S or substrate holder SH.

In the embodiment, if a structure (the structure of the magnification correction mechanism of the mold M or the like) that has the distance h as short as the distance between the mold M and the substrate S exists in the periphery of the mold M, the simulation apparatus can also receive position information (position, size, and height) of the structure. However, the structure in the periphery of the mold M is normally provided at a height higher than the lower surface of the mold M to some extent in order to avoid contacting the substrate S at the time of an imprint operation. Thus, contribution to the pressure p between the mold M and the substrate S is often small. Therefore, to obtain the pressure between the mold M and the substrate S, the structure of a region up to the outer shape of the mold M is normally considered.

The distance h between the mold M and the substrate S at the time of liquid contact can finally be a value as very small as about 10 to 100 nm. In general, if the distance h between the mold M and the substrate S is short, as compared with a mean free path of gas molecules between the mold M and the substrate S, the gas is not regarded as a continuum, and is dealt with as a dilute fluid, and it is desirable to consider that there is sliding between the gas G and the mold M or the substrate. As a lubrication equation applicable to this case, there is known equation (12) called a modified lubrication equation obtained by modeling sliding on the wall surface and incorporating it.

$$\frac{\partial}{\partial t}(ph) + \nabla \cdot \left(-\frac{h^2}{12\mu}Qph\nabla p\right) = 0 \quad (12)$$

where Q represents a modification coefficient and is given by:

$$Q = 1 + \beta Kn\frac{p_a}{p} + \gamma\left(Kn\frac{p_a}{p}\right)^2 \quad (13)$$

where Kn represents a Knudsen number which is a dimensionless number given by Kn=λ/h using a mean free path λa of the gas molecules and the distance h between the mold M and the substrate S, Pa represents an ambient pressure, and β and γ represent the model parameters of the modified lubrication equation and take different values depending on the model.

Since the pressure of the residual gas confined among the plurality of droplets at the time of an imprint operation is considered to become a pressure when a very small gap immediately before the imprint operation is obtained, equation (12) is desirably used to predict the pressure, instead of equation (6). When using equation (12), it is necessary to give β and γ. It is easy for the user to designate a model, as compared with an operation of directly inputting β and γ. One of a plurality of kinds of models may be selectable or an appropriate model may be selected in advance based on prior examination. Furthermore, it is necessary to obtain the Knudsen number Kn in equation (13). Since the mean free path λa is different depending on the type of gas molecules, λa may be input directly. Alternatively, the van der Walls radius of the gas molecules may be input to obtain the mean free path λ. Alternatively, the type of gas molecules may be selectable from a plurality of candidates prepared in advance. If the mean free path λa prepared in advance is associated with each candidate, the mean free path λa corresponding to the selected type of gas molecules is obtained. This method is easy for the user, and is thus desirable.

Figure 8:
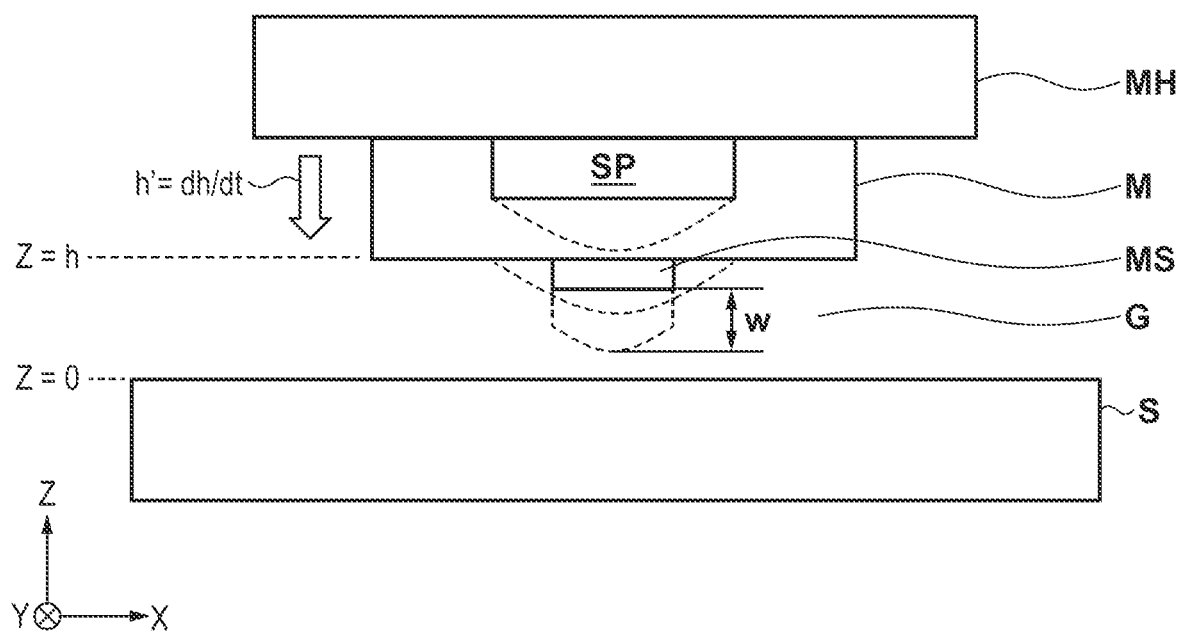
FIG. 8 is a view for explaining the distribution of the distance between the warped mold and the substrate.

A case in which the mold M moves in a shape swelling due to a cavity pressure will be described with reference to FIG. 8. A cored-out portion (concave portion) having undergone a spot facing process is formed on the opposite side of the mesa portion MS of the mold M. When the cavity space SP as a closed space formed by the cored-out portion and the mold holder MH that holds the mold M is pressurized, the cored-out portion can be warped toward the substrate S. The pressure of the cavity space will be referred to as a cavity pressure hereinafter. The mold M normally moves toward the substrate S in a state in which the cored-out portion is warped. FIG. 8 schematically shows, by broken lines, the shape of the warped cored-out portion of the mold M. A warp amount is represented by w.

A shape measured in a still state can be input as the deformation shape of the mold M by the cavity pressure. Alternatively, a warp deformation shape may be computed by dividing the mold M into the computational grid. To compute the warp deformation of the mold M, for example, a Young's modulus E and a Poisson's ratio v decided based on the material of the mold M can be input to the simulation apparatus 1. Since, in general a thin portion is readily deformed, as compared with a thick portion, the cored-out portion is mainly deformed in the mold M. Therefore, for example, the value of the size (a diameter $d_c$ and a thickness $t_c$) of the cored-out portion can be input to the simulation apparatus 1. A general elastic mechanics equation can be applied to computation of the warp deformation of the mold M. However, if the computational grid is created the Z direction of the mold M for the deformation computation, concern grows over an increase in computation time.

The cored-out portion is approximated as a thin plate having the same stiffness as that of the core-out portion using a bending stiffness D of a plate. The warp amount w of the cored-portion swelling due to a cavity pressure pc at this time is given by equation (14) below. The bending stiffness D of the plate is given by equation (15) below. This eliminates the necessity of creating the computational grid in the Z direction of the cored-out portion, and it is expected to reduce the computation time.

$$D\nabla^4 w = p_c \quad (14)$$

$$D = \frac{Et_c}{12(1-v^2)} \quad (15)$$

Equation (14) is solved using a difference method or the like on the computational grid divided in the X and Y directions. A new distance hn=h−w obtained by subtracting the obtained warp amount w from the distance h between the mold M and the substrate S is computed by giving hn of a different value for each computational grid m the X and Y directions when solving equation (6), similar to a case in which the above-described distance h is distributed. This makes it possible to consider the distribution of the pressure p of the gas G on which the warp deformation caused by the cavity pressure is reflected.

Note that the cored-out portion has a circular shape in the above description but the present invention is not limited to this. The cored-out portion may have, for example, a rectangular shape. If the cored-out portion has a rectangular shape, the size (the length on each side) and the thickness of the cored-out portion can be input to the simulation apparatus. Structure information contributing to the stiffness of the cored-out portion such as information of the round shape of the corner of a spot facing portion may be input to the simulation apparatus. In this case, the user of the simulation apparatus additionally performs analysis to appropriately scale the bending stiffness D of the plate.

The above example has explained that the mold M is deformed by the cavity pressure pc. However, in a state in which the mold M is warped and deformed downward by the cavity pressure pc, the mold M is pressed back upward by the pressure p of the gas G between the mold M and the substrate S applied by the motion of the mold M, and can further be warped and deformed. To cope with this, the simulation apparatus can also consider the warp deformation of the mold M caused by the pressure p of the gas G to implement this, equation (14) is changed to equation (16).

$$D\nabla^4 w = p_c + p \quad (16)$$

Thus, it is possible to consider the warp deformation caused by the pressure p of the gas G in addition to the warp deformation caused by the cavity pressure.

The warp deformation of the mold M does not occur instantaneously, and it takes some time to reach a stationary deformation amount. To cope with this, a damping ratio c of the mold and a mass area density p decided by the material of the mold can be input to the simulation apparatus 1 in order to consider the damping and inertia of the cored-out portion of the mold M. To do this, equation (16) is changed to equation (17) below.

$$D\nabla^4 w = p_c + p - \rho\ddot{w} - c\dot{w} \quad (17)$$

where w represents the warp amount, "." above w represents the time differential, and ".." above w represents the second order time differential.

Thus, it is possible to consider the temporal change of the warp deformation in addition to the warp deformation caused by the cavity pressure. Therefore, the prediction accuracy of the pressure p of the gas G is improved, thereby improving the prediction accuracy of unfilled defects caused by the residual gas.

At the time of liquid contact, after it is considered that the mold M reaches the target value of the driving range and starts to contact, droplets, the actuator of the mold holder MH can perform three control of the mold M. At this time, the pressure control unit PC gradually releases the cavity pressure pc so that filling with the curable composition quickly advances outward from the center of the mold M. The distance h between the mold M and the substrate S and the velocity h' of the mold M change moment by moment. Therefore, the pressure p of the gas G between the mold M and the substrate S can also change moment by moment. To reflect the influence of these changes on the simulation, it is necessary to input a force (pressing force) given to the mold M at each time and the time-series waveform of the cavity pressure in addition to the parameters input at the time of non-liquid contact.

Furthermore, in the film forming apparatus IMP, the mold M is held by the mold holder MH, and the movable portion of the mold holder MH moves by receiving a force from the mold driving mechanism MD of the fixed portion. Therefore, it is possible to input the mass of the movable portion to the simulation apparatus 1 in order to consider the inertia of the movable portion of the mold holder MH. After liquid contact, the mold M can also receive a force from droplets. By obtaining the velocity h' of the mold M from them, it is possible to consider the pressure p of the gas G between the mold M and the substrate S even after liquid contact.

Third Embodiment

A modification of a method of estimating a volume V of a residual gas GZ will be described below. FIGS. 9A and 9B are views schematically showing the residual gas GZ among droplets spreading after an imprint operation. FIG. 9A is a plan view of the residual gas GZ and droplets drp when viewed from above, and FIG. 9B is a side view. A portion surrounded by the droplets corresponds to the volume V of the residual gas GZ. It is understood that the volume V of the residual gas GZ indicated by a hatched portion in FIG. 9B includes a portion that changes due to unevenness of the pattern of the mesa portion of a mold M and unevenness of a substrate S caused by an underlying structure. Increase decrease of the volume V caused by unevenness of the pattern of the substrate S can be reflected on a simulation by inputting the design information of the mold M. Furthermore, increase/decrease of the volume V by unevenness of the substrate S caused by the underlying structure can be reflected on the simulation by inputting, for example, information obtained by measuring unevenness of the substrate S in advance. This makes it possible to more correctly consider the volume V of the residual gas GZ.

The above-described embodiment assumes that the dispenser DSP arranges the droplets drp in a shot region on the substrate S without deviating from target positions input to a drop recipe. It is also assumed that the volume of each arranged droplet is not deviated from a target volume. In fact, however, these values can be deviated from the target values within the range of the specifications of the landing position accuracy and discharge volume accuracy of the dispenser. Deviations from the target values may degrade the prediction accuracy of the volume V of the residual gas among the droplets. Therefore, it may be possible to input these pieces of information to the simulation. For example, it is possible to reflect the pieces of information on the simulation by a method of inputting the range of the specifications of the dispenser and randomly disperse the pieces of information. It is thus possible to consider the variations of the volume of the residual gas.

Fourth Embodiment

Figure 10:
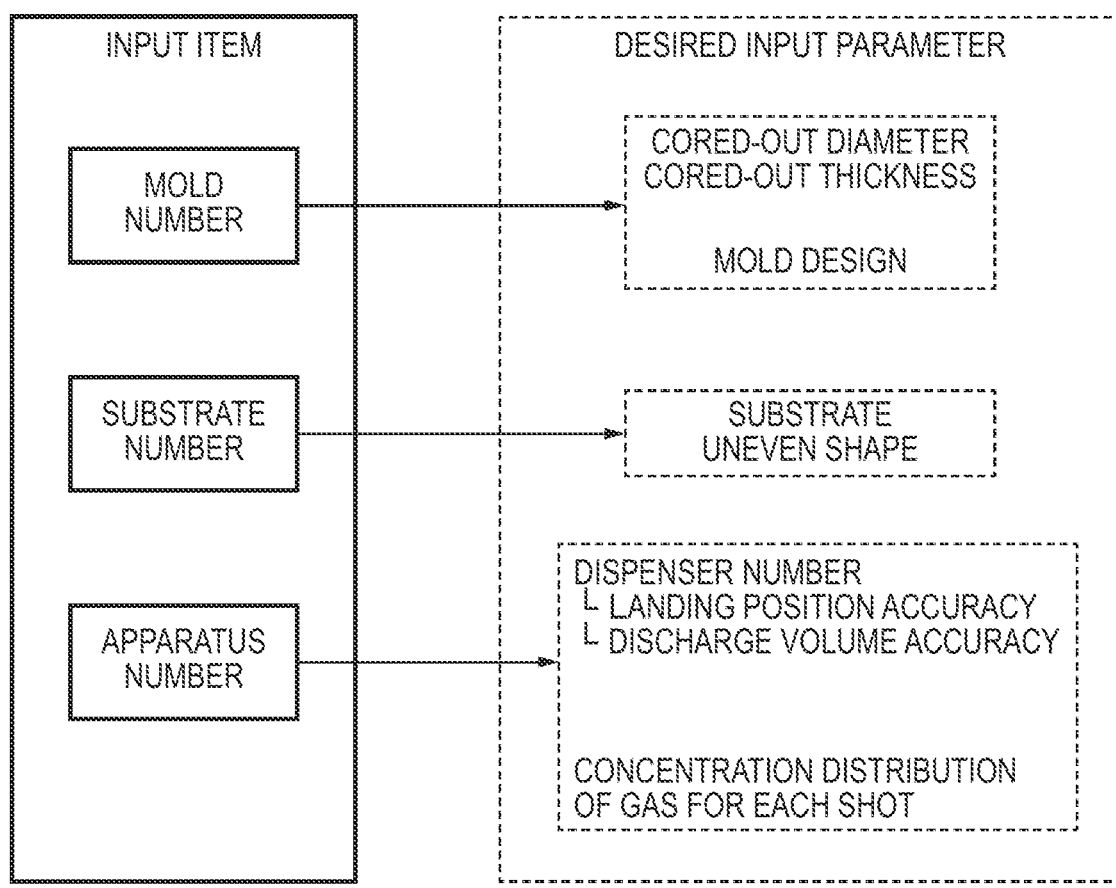
FIG. 10 is a view showing the correspondence between each input item and input parameters.

According to the above-described embodiment, the parameters of the shape of the mold M, the parameters of the shape of the substrate S, and parameters based on the apparatus structure or specifications can be input to the simulation apparatus individually. In the fourth embodiment, these parameters are input in association with the specific number of a mold M, that of a substrate S, and that of an apparatus. For example, the parameters of the shape of the mold, for example, the diameter and thickness of the cored-out portion of the mold are unique to each mold, and are normally measured in advance before being used in an imprint operation. Therefore, it is possible to associate these values with the specific number of the mold. Furthermore, it is cumbersome to input these values individually. As shown in FIG. 10, it is desirable for the user of the simulation that when the specific number of the mold is input, the parameters of the shape of the mold are input in linkage with the specific number.

Similarly, for the substrate as well, it is desirable to input, for example, unevenness information of the measured substrate in association with the specific number of the substrate. Similarly, for the apparatus as well, for example, it is desirable for the user of the simulation that the landing position accuracy and discharge volume accuracy of the dispenser as a constituent unit of the apparatus are input in association with the apparatus number or the specific number of the dispenser. Alternatively, if it is known that the concentration distribution of the gas between the mold and the substrate has a distribution in a substrate surface due to the apparatus structure, the concentration distribution of the gas may be associated with the position of the shot region on the substrate.

As described above, in this embodiment, at least correspondence among the specific number of the substrate S, the specific number of the mold M, and values to be input is defined in advance. Then, when the specific number of the substrate S or that of the mold M is input, values to be input to predict the amount of the residual gas are decided based on the above correspondence. This can prevent rework caused by erroneous input of various parameters, resulting in improvement of the prediction accuracy of unfilled defects caused by the residual gas within a short period.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplars embodiments. The scope of the following claims is to be accorded the broadest interpretation so as to encompass all such modifications and equivalent structures and functions.

This application claims the benefit of Japanese Patent Application No. 2019-219856, filed Dec. 4, 2019, which is hereby incorporated by reference herein in its entirety.

What is claimed is:

1. A method of forming a film, comprising:
inputting a physical property value of a gas between the first member and the second member;
inputting a movement profile of the second member with respect to the first member when bringing the plurality of droplets of the curable composition arranged on the first member and the second member into contact with each other;
obtaining a pressure of the gas between the first member and the second member based on the input physical property value and the input movement profile; and
predicting, based on the obtained pressure, an amount of a residual gas confined among the plurality of droplets by the contact between the plurality of droplets and the second member;
arranging a plurality of droplets of a curable composition on one of a first member and a second member;
bringing the plurality of droplets of the curable composition arranged on one of a first member and a second member into contact with an other of the first member and the second member; and
forming, based on the determining, from the plurality of droplets a film of the curable composition on the first member,
wherein
the second member includes a mesa portion in which a pattern to be transferred to the curable composition is formed, and
the method further comprising:
inputting a position, a size, and a height of the mesa portion with respect to a reference position of the second member, and
predicting the amount of the residual gas further based on the input position, size, and height of the mesa portion.

2. The method according to claim 1, wherein the pressure of the gas between the first member and the second member is obtained from a relational expression representing the relationship between a moving velocity of the second member obtained from the movement profile and the pressure of the gas between the first member and the second member.

3. The method according to claim 2, wherein the physical property value includes a value representing a viscosity of the gas.

4. The method according to claim 3, wherein the relational expression comprises a lubrication equation based on a Navier-Stokes equation.

5. The method according to claim 1, wherein the movement profile includes a value of a velocity of the second member at each time.

6. The method according to claim 1, wherein the movement profile includes a value of an acceleration or a position of the second member at each time.

7. The method according to claim 1, wherein the movement profile includes values of a moving target position, a moving distance, and a moving time of the second member at each time.

8. The method according to claim 1, wherein the movement profile includes a value indicating a time ratio of a constant acceleration section in an acceleration profile of the second member.

9. The method according to claim 1, wherein
the second member includes a concave portion formed in a surface on an opposite side of a surface contacting the curable composition, and
the method further comprising:
inputting a size, a Young's modulus, and a Poisson's ratio of the concave portion, and
obtaining a warp amount of the concave portion based on the input size, Young's modulus, and Poisson's ratio of the concave portion,
wherein the step of predicting predicts the amount of the residual gas further based on the obtained warp amount.

10. The method according to claim 9, further comprising:
inputting a mass area density and a damping ratio of the second member; and
obtaining a temporal change of warp deformation of the concave portion, wherein the step of predicting predicts the amount of the residual gas further based on the obtained temporal change.

11. The method according to claim 9, further comprising inputting a pressing force at each time to be applied to the second member by a driving mechanism of driving a movable portion in a holder that holds the second member, a pressure at each time to be applied, to a closed space formed in the concave portion, by a pressure control unit that controls a pressure of the closed space, and a mass of the movable portion, and wherein the step of predicting predicts the amount of the residual gas further based on the input pressing force at each time, the input pressure at each time, and the input mass.

12. The method according to claim 1, further comprising inputting unevenness information of the first member and unevenness information of the second member, and wherein the step of predicting predicts the amount of the residual gas further based on the input unevenness information of the first member and the input unevenness information of the second member.

13. The method according to claim 1, further comprising inputting a diffusion coefficient and solubility of the gas with respect to at least one of the first member, the second member, the curable composition, and an underlying film on the first member, and wherein the step of predicting predicts the amount of the residual gas further based on the input diffusion coefficient and solubility of the gas.

14. The method according to claim 1, further comprising inputting a type of molecules of the gas, and wherein the step of predicting predicts the amount of the residual gas further based on the input type of molecules of the gas.

15. The method according to claim 1, further comprising inputting a temperature of the gas, and wherein the step of predicting predicts the amount of the residual gas further based on the input temperature of the gas.

16. The method according to claim 1, wherein a correspondence among a specific number related to a shape of the first member, a specific number related to a shape of the second member, and a value to be input related to predicting an amount of residual gas is defined in advance, and when one of the specific number of the first member and the specific number of the second member is input, a value to be input related to predicting the amount of the residual gas is determined based on the correspondence.

17. A computer-readable storage medium storing a program for causing a computer to execute a method defined in claim 1.

18. An apparatus for forming a film, comprising:

a processor; and a memory storing instructions that, when executed by the processor, cause the apparatus to:

input a physical property value of a gas between the first member and the second member;

input a movement profile of the second member with respect to the first member when bringing the plurality of droplets of the curable composition arranged on the first member and the second member into contact with each other;

obtain a pressure of the gas between the first member and the second member based on the input physical property value and the input movement profile; and predict an amount of a residual gas confined among the plurality of droplets by the contact between the plurality of droplets and the second member based on the obtained pressure;

arrange a plurality of droplets of a curable composition on one of a first member and a second member;

bring the plurality of droplets of the curable composition arranged on one of a first member and a second member into contact with an other of the first member and the second member; and form, based on the determining, from the plurality of droplets a film of the curable composition on the first member, wherein the second member includes a mesa portion in which a pattern to be transferred to the curable composition is formed, and the instructions, when executed by the processor, further cause the apparatus to:

input a position, a size, and a height of the mesa portion with respect to a reference position of the second member, and predict the amount of the residual gas further based on the input position, size, and height of the mesa portion.

* * * * *